(12) United States Patent
Chaumet et al.

(10) Patent No.: US 7,051,591 B2
(45) Date of Patent: May 30, 2006

(54) MICROMACHINED DOUBLE TUNING-FORK GYROMETER WITH DETECTION IN THE PLANE OF THE MACHINED WAFER

(75) Inventors: Bernard Chaumet, Chatellerault (FR); Eric Loil, Chatellerault (FR)

(73) Assignee: Thales, Neuilly sur Seine (FR)

( * ) Notice: Subject to any disclaimer, the term of this patent is extended or adjusted under 35 U.S.C. 154(b) by 70 days.

(21) Appl. No.: 10/926,332

(22) Filed: Aug. 26, 2004

(65) Prior Publication Data

US 2005/0097956 A1    May 12, 2005

(30) Foreign Application Priority Data

Sep. 9, 2003  (FR)  ................................. 03 10608

(51) Int. Cl.
*G01P 9/04*    (2006.01)
(52) U.S. Cl. ................................. 73/504.12; 73/504.16
(58) Field of Classification Search ............. 73/504.12, 73/504.14, 504.16
See application file for complete search history.

(56) References Cited

U.S. PATENT DOCUMENTS

| 5,940,179 A | 8/1999 | Jaulain et al. |
| 6,002,535 A | 12/1999 | Jaulain et al. |
| 6,498,651 B1 | 12/2002 | Loil |
| 6,705,164 B1 * | 3/2004 | Willig et al. ............. 73/504.12 |
| 2003/0131664 A1 | 7/2003 | Mochida et al. |

FOREIGN PATENT DOCUMENTS

| EP | 1170573 A | 7/2002 |
| WO | 02/066927 A | 8/2002 |

* cited by examiner

*Primary Examiner*—John E. Chapman
(74) *Attorney, Agent, or Firm*—Lowe Hauptman & Berner, LLP

(57) ABSTRACT

The invention relates to a gyrometer based on a vibrating structure, produced by micromachining in a thin planar wafer, including two symmetrical moving assemblies coupled by a coupling structure connecting these two assemblies in order to allow transfer of mechanical vibration energy between them, each moving assembly comprising three moving elements, a first inertial moving element intended to vibrate in two orthogonal directions Ox and Oy in the plane of the wafer, a second moving element intended to vibrate along Oy and connected to the first moving element and to fixed anchoring zones, by first linking means which allow the vibration movement of the first moving element along Oy to be transmitted to the second moving element without permitting movement of the second element along the Ox direction and a third moving element intended to vibrate along Oy and connected to the second moving element and to fixed anchoring zones by second linking means which allow the vibration movement of the second moving element along Oy to be transmitted, in phase opposition, to the third moving element.

20 Claims, 2 Drawing Sheets

MICROMACHINED DOUBLE TUNING-FORK GYROMETER WITH DETECTION IN THE PLANE OF THE MACHINED WAFER

RELATED APPLICATIONS

The present application is based on, and claims priority from France Application Number 03 10608, filed Sep. 9, 2003, the disclosure of which is hereby incorporated by reference herein in its entirety.

FIELD OF THE INVENTION

The invention relates to inertial sensors intended for measuring angular velocities, or gyrometers, and more precisely to gyrometers that are micromachined using the technologies of etching, deposition, doping, etc., these being similar to those used in the field of integrated electronic circuits.

BACKGROUND OF THE INVENTION

Such micromachined inertial sensors produced on a silicon or quartz wafer are already known. The structure is planar in the plane of the silicon or quartz wafer in which it is etched.

Structures based on two vibrating masses mechanically coupled in the manner of a tuning fork have already been produced. The structure of a gyrometer thus produced typically comprises two coplanar moving masses that are excited in vibration and connected as a tuning fork, that is to say the two masses are connected to a central coupling structure that transfers the vibration energy from the first mass to the second mass, and vice versa.

The masses are excited into vibration in the plane of the wafer by an electrical excitation structure. This vibration in the plane of the wafer is exerted perpendicular to an axis called the "sensitive axis" of the gyrometer, perpendicular to the direction of this vibration. When the gyrometer rotates at a certain angular velocity about its sensitive axis, the composition of the forced vibration with the angular rotation vector generates, by the Coriolis effect, forces that set the moving masses into natural vibration perpendicular to the excitation vibration and to the axis of rotation; the amplitude of this natural vibration is proportional to the speed of rotation.

The natural vibration is detected by an electrical detection structure. The electrical signals that result therefrom are used to deduce from them a value of the angular velocity about the sensitive axis.

In certain cases the sensitive axis lies in the plane of the wafer and the detection structure detects a movement perpendicular to the plane of the moving masses. In other cases, the sensitive axis of the gyrometer is the axis Oz perpendicular to the plane of the wafer. The excitation movement of the moving masses is generated in a direction Ox of the plane, while a movement resulting from the Coriolis force is detected in a direction Oy, perpendicular to Ox, in the same plane.

The masses are capable of vibrating in two orthogonal vibration modes—the excitation mode, also called the primary mode, and the detection mode, also called the secondary mode.

The tuning-fork architecture has a drawback: the secondary mode is not in dynamic equilibrium. Consequently, this mode transmits a moment to the support of the tuning fork, which makes this mode sensitive to the conditions of attachment to the support and sensitive to the external perturbations transmitted by the support.

To remedy this problem, one solution consists in isolating the secondary mode using a double tuning-fork structure as shown in FIG. 1. The most well-known example is that of a Systron-Donner quartz double tuning-fork gyrometer.

The excitation movement parallel to Ox is provided by the upper fork as indicated in the figure and the sensitive axis is the Oy axis. The Coriolis moment created on the excitation fork generates a detection movement on the upper fork. An opposed detection movement is induced, by coupling, in the lower fork. This movement of the lower fork in phase opposition with that of the upper fork then allows the detection mode to be completely isolated. However, in such a gyrometer the detection movement lies out of the plane of the substrate. This has drawbacks such as, for example, the greater difficulty in controlling the orthogonality between the excitation movement and the detection movement, and a more complicated fabrication technology.

SUMMARY OF THE INVENTION

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

It is an object of the invention to propose a dynamically balanced microgyrometer structure, the excitation and detection movements of which lie in the plane of the wafer. Another object is to propose a structure that also allows a rotation measurement with a very high sensitivity and extremely small perturbations due to the excitation movement or to other effects.

The invention proposes a gyrometer based on a vibrating structure, produced by micromachining in a thin planar wafer, which principally comprises two symmetrical moving assemblies coupled by a coupling structure connecting these two assemblies in order to allow transfer of mechanical vibration energy between them, each moving assembly comprising three moving elements, a first inertial moving element intended to vibrate in two orthogonal directions Ox and Oy in the plane of the wafer, a second moving element intended to vibrate along Oy and connected to the first moving element and to fixed anchoring zones, by first linking means which allow the vibration movement of the first moving element along Oy to be transmitted to the second moving element without permitting movement of the second element along the Ox direction and a third moving element intended to vibrate along Oy and connected to the second moving element and to fixed anchoring zones by second linking means which allow the vibration movement of this second moving element along Oy to be transmitted, in phase opposition, to the third moving element.

A double tuning-fork gyrometer is thus obtained which makes it possible for the detection movement to be thus balanced within each of the two moving assemblies owing to the fact that the movement of the third moving element counterbalances the movement of the first and second moving elements.

Furthermore, the first element is excited into movement along Ox but does not cause the second element to undergo this movement.

In practice, the first moving element is a rectangular external intermediate frame connected to the coupling structure and surrounding the second moving element consisting of a rectangular internal intermediate frame, which itself surrounds the third moving element, and the coupling structure comprises an outer frame surrounding the external intermediate frame.

BRIEF DESCRIPTION OF THE DRAWINGS

Other features and advantages of the invention will become apparent on reading the detailed description that follows, this being given with reference to the appended drawings in which.

DETAILED DESCRIPTION OF THE INVENTION

Figure 1:
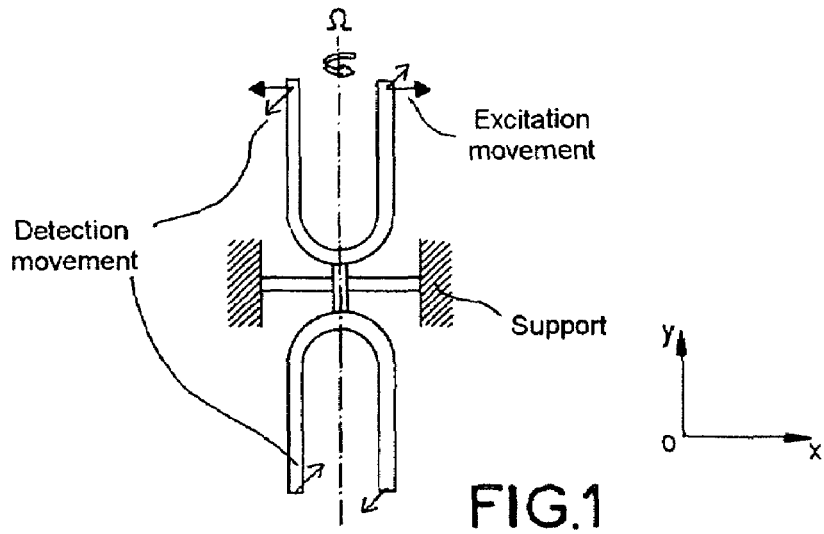
FIG. 1, already described, shows schematically a double tuning-fork gyrometer.
Figure 2:
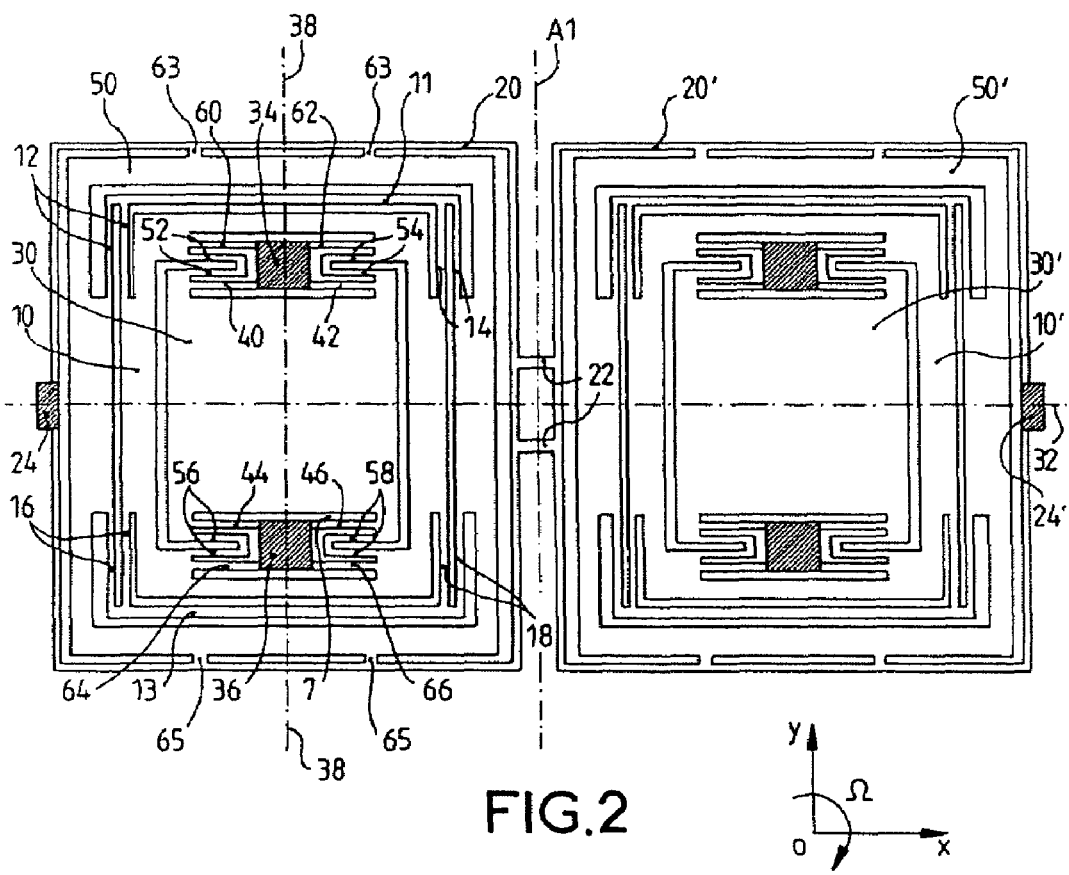
FIG. 2 shows schematically, in top view, the overall structure of the micromachined gyrometer according to the invention.

FIG. 2 shows the thin planar silicon wafer according to the invention, machined in order to make a gyrometer whose sensitive axis is perpendicular to the plane of the wafer (which is the plane of the figure).

Silicon is chosen as preferred material, on the one hand for its mechanical properties and on the other for its high conductivity when it is sufficiently doped with an appropriate impurity (in general, boron in the case of p-type silicon). Conductive silicon makes it possible to produce the electrical functions of the gyrometer and especially the excitation functions and the detection functions; these functions are performed by interdigitated capacitive combs supplied with electrical current or voltage; the fingers of these combs, directly machined in the conductive silicon, serve as plates of capacitors useful for the excitation functions and for the detection functions.

The thickness of the starting silicon wafer is, for example, a few hundred microns; the wafer has, on the one hand, fixed anchoring zones formed in this thickness and, on the other hand, the actual vibrating structure, which is free relative to the anchoring zones and formed within a smaller thickness, for example within a thickness of around sixty microns, isolated from the rest of the thickness of the wafer by a narrow gap. The silicon wafer is cut by micromachining, within this thickness of around sixty microns, into the desired moving mass features, moving frame, coupling structure, flexure arms and interdigitated combs.

The machining of the structure may be carried out using, as starting substrate, a silicon-on-insulator substrate, but other methods are also possible. A silicon-on-insulator substrate consists of a silicon substrate a few hundred microns in thickness that bears, on its front face, a thin layer of silicon oxide, which is itself covered with a layer of single-crystal silicon a few tens of microns in thickness. The machining consists of etching the silicon of the substrate via its front face, into the desired surface patterns, by means of photoetching techniques commonly employed in microelectronics, until the oxide layer is reached, with a selective etchant that etches the silicon without significantly etching the oxide. The etching is stopped when the oxide layer is beared. This oxide layer is then removed by selective etching using another etchant so as to retain only the single-crystal silicon surface layer, except at the place of the anchoring zones where the oxide layer remains and forms a firm link between the substrate and the single-crystal silicon surface layer. The machining via the front face defines the various recesses of the moving parts, it is therefore these surface features, anchoring zones and recesses of the moving parts that may be seen in the figures.

The overall structure of the gyrometer is a structure of the double tuning-fork type, that is to say a symmetrical structure comprising two moving inertial assemblies vibrating in phase opposition, these moving assemblies being connected together by a coupling structure serving to transmit, without any losses, from one assembly to the other, the mechanical vibration energies of the two assemblies in order to place these vibrations in phase opposition. The symmetry of the structure is a symmetry with respect to an axis A1, with a moving assembly on each side of this axis.

The coupling structure preferably consists of two rectangular outer frames 20 and 20' inside which the moving inertial assemblies are located. The frames 20 and 20' are connected together by a short two-bar linking element 22 which may be considered as being rigid. The two-bar linking element 22 connects one side of the first frame to the adjacent side of the second frame. It is perpendicular to axis A1 and centered on this axis. The short two-bar linking element 22 may be simply by itself or reinforced by another short linking arm located in the middle of the two-bar element 22 and also centered on the axis A1. Increasing or decreasing the distance between each of the bars constituting the two-bar element 22 allows the difference between the useful excitation and detection frequencies of the microgyrometer to be adjusted to a certain extent.

The outer frames 20 and 20' of the coupling structure surround the two moving assemblies, in principle by at least three sides and they are preferably connected to these two assemblies alongside perpendicular to the general axis of symmetry A1. The frames 20 and 20' may (optionally) each be fixed to an anchoring zone 24, 24' located in the middle of a side opposite the side connected to the double-bar linking element 22. In this case, the frames 20 and 20' each completely surround a respective inertial moving assembly. The central double-bar linking element 22 and the other sides of the frames 20 and 20' are not connected to fixed anchoring zones.

The interdigitated combs used for setting the inertial assemblies into vibration and for detecting the movement resulting from the Coriolis force are themselves placed inside each of the outer frames 20 and 20'. In the following, only the elements located inside the frame 20 will be described, the structure being strictly identical in the case of the other frame 20'; the elements internal to the frame 20' are denoted by the same reference numerals as those of the frame 20, but with the addition of the "prime" symbol.

Each inertial assembly comprises a central moving inertial mass 30, an internal intermediate inertial frame 10 which surrounds it and an external intermediate inertial frame 50 which surrounds the internal frame 10 and which is therefore located between the internal intermediate frame 10 and the outer frame 20.

The central mass 30, which is referred to as the detection mass, and the internal intermediate frame 10 can move only along a direction Oy (a vertical axis in the plane of the figure); the external intermediate frame 50 can move along the axis Oy and along an axis Ox perpendicular to Oy and also lying in the plane of the figure. The sensitive axis of the gyrometer is an axis Oz perpendicular to the plane of the wafer. A vibration of the external inertial intermediate frame 50 is excited in the Ox direction; when the gyrometer rotates about its sensitive axis Oz, a vibration of the external intermediate frame 50 is generated along the Oy axis. This vibration along Oy is transmitted to the internal intermediate frame 10, whereas the vibration along Ox is not transmitted: the vibration along Oy of the internal intermediate frame 10 is in phase with that of the external intermediate frame 50. The vibration along Oy of the internal intermediate frame 10 is transmitted to the mass 30: the vibration along Oy of the mass 30 is in phase opposition with that of the internal frame 10 and has an amplitude proportional to the vibration movement of the internal frame 10. The detection movement is thus balanced within each of the two moving assemblies owing to the fact that the movement of the detection mass 30 counterbalances the movement of the internal 10 and external 50 intermediate frames.

According to another embodiment, the central mass 30 may move along the axis Oy and along an axis Ox, the internal 10 and external 50 intermediate frames being able to move only along the direction Oy. A vibration of the central mass 30 in the Ox direction is excited; when the gyrometer rotates about its sensitive axis Oz, a vibration of the central mass 30 is generated along the axis Oy. This vibration along Oy is transmitted to the internal intermediate frame 10, whereas the vibration along Ox is not transmitted. This vibration of the internal intermediate frame 10 along Oy is transmitted to the external intermediate frame 50.

The rest of the description is based on the first embodiment, which is a preferred embodiment.

As will be seen, a vibration excitation structure is associated with the external intermediate frame 50 and a vibration detection structure is associated with the detection mass 30. The coupling structure, consisting of the frames 20, 20' and the two-bar element 22 that connects them, transmits the mechanical vibration energy of the moving inertial assembly on one side of the axis A1 to the other, both for vibrations along Ox and vibrations along Oy, since this coupling structure is connected directly to the intermediate frames that can vibrate along Ox and along Oy at the same time.

The detection mass 30 is connected to fixed anchoring zones by at least two flexure arms designed to permit displacement of the mass along Oy but to prevent any significant movement of the mass in the Ox direction. These arms are preferably located on either side of an axis of symmetry 32 of the mass, parallel to Ox. There are therefore two anchoring zones 34 and 36 located on either side of the detection mass, these being symmetrical with respect to this axis of symmetry 32. In addition, these zones are preferably located on another axis of symmetry 38 of the mass, which axis is parallel to Oy. The flexure arms that connect the mass 30 to the zones 34 and 36 are arms elongate in the Ox direction, so as to exhibit high stiffness (high resistance to elongation) in this direction. They are also very narrow, compared to their length, in order to exhibit low stiffness in the Oy direction perpendicular to Ox; this low stiffness permits displacement of the mass along Oy. There are preferably four flexure arms rather than two, the mass being connected to the anchoring zone 34 by two arms 40 and 42 on either side of the zone 34; the mass is also connected to the second anchoring zone 36 by two arms 44 and 46 on either side of the zone 36.

To maximize the flexibility of the flexure arms in the Oy direction by increasing the length/width ratio of these arms, each arm is connected on one side close to an end corner of the mass (the mass has in principle a generally rectangular shape) and on the other side to the anchoring zone located on the axis of symmetry 38. It should be noted that, instead of one central anchoring zone located in the middle of one side of the moving mass, it would be possible to have two anchoring zones located rather close to the end corners of the mass on either side of the axis 38.

Preferably, the internal moving intermediate frame 10 completely surrounds the mass 30. The mass 30 is connected to the internal intermediate frame 10 by at least two flexure arms which have the particular feature of exhibiting very high stiffness (very high resistance to elongation) in the Ox direction and low stiffness in the Oy direction. These arms are elongate in the Oy direction and have a small width compared to their length, so as to exhibit this stiffness difference.

There are preferably four flexure arms of this type between the mass 30 and the internal intermediate frame 10, the arms being each located in practice at a corner of the moving mass if the latter is of a generally rectangular shape. They are placed symmetrically, on the one hand, with respect to the axis of symmetry 32 of the mass (an axis parallel to Ox) and, on the other hand, with respect to the axis of symmetry 38 (parallel to Oy).

These arms are detected by the reference numerals 52, 54, 56, 58. Preferably, they are folded in the form of a U in order to reduce their longitudinal dimension by half, without significantly reducing their useful length, and therefore without significantly reducing the high ratio of their stiffness along Oy to their stiffness along Ox. The two U-folded branches are elongate parallel to Ox and are connected together by a short linking element. However, it would be possible for the arms 52 to 58 not to be folded, but to lie completely along the Ox direction between the internal intermediate frame and the mass. Folding makes it possible to save space without significantly modifying the desired mechanical properties.

As may be seen in FIG. 2, the folded shape in the form of an elongate U of the flexure arms between the internal intermediate frame 10 and the detection mass 30 is obtained by recesses in the internal intermediate frame and in the moving mass.

These second flexure arms 52, 54 are located between the first flexure arms 40, 42, which connect the mass 30 to the anchoring zone 34, and third flexure arms 60, 62, which connect the internal intermediate frame 10 to this anchoring zone 34. Likewise, the second flexure arms 56, 58 are located between the first flexure arms 44, 46, which connect the mass 30 to the anchoring zone 36, and third flexure arms 64, 66, which connect the internal intermediate frame 10 to this anchoring zone 36.

The internal intermediate frame 10 is connected to these fixed anchoring zones 34, 36 by at least two flexure arms designed to permit displacement of the mass along Oy, but to prevent any significant movement of the mass in the Ox direction. These arms are preferably located on either side of an axis of symmetry 32 of the mass, parallel to Ox. The flexure arms which connect the internal intermediate frame 10 to the zones 34 and 36 are arms elongate in the Ox direction so as to exhibit high stiffness (high resistance to elongation) in that direction. They are also very narrow, compared to their length, in order to exhibit low stiffness in the Oy direction perpendicular to Ox; this low stiffness permits displacement of the internal intermediate frame along Oy. There are preferably four flexure arms rather than two, the internal intermediate frame being connected to the anchoring zone 34 by two arms 60 and 62 on either side of the zone 34; the internal intermediate frame is also connected to the second anchoring zone 36 by two arms 64 and 66 on either side of the zone 36.

To maximize the flexibility of the flexure arms in the Oy direction by increasing the length/width ratio of these arms, each arm is connected on one side close to an end corner of the mass (the mass has in principle a generally rectangular shape) and on the other side to the anchoring zone located on the axis of symmetry 38.

Preferably, the external moving intermediate frame 50 completely surrounds the internal intermediate frame 10. The internal intermediate frame 10 is connected to the external intermediate frame 50 by at least two flexure arms that have the particular feature of exhibiting very high stiffness (very high resistance to elongation) in the Oy direction and a low stiffness in the Ox direction. These arms are elongate in the Oy direction and have a small width compared to their length, so as to exhibit this stiffness difference.

There are preferably four flexure arms of this type between the internal 10 and external 50 intermediate frames, the arms in practice each being located at a corner of the internal intermediate frame. They are placed symmetrically, on the one hand, with respect to the axis of symmetry 32 (an axis parallel to Ox) and, on the other hand, with respect to the axis of symmetry 38 (parallel to Oy).

These arms are denoted by the reference numerals 12, 14, 16, 18. Preferably, they have a folded shape in the form of a U in order to reduce their longitudinal dimension by half without significantly reducing their useful length, and therefore without significantly reducing the high ratio of their stiffness along Oy to the stiffness along Ox. The two U-shaped folded branches are elongate parallel to Oy and are connected together by a short linking element. However, it would be possible for the arms 12, 14, 16, 18 not to be folded but to extend entirely along the Oy direction between the internal intermediate frame and the external intermediate frame. The folding makes it possible to save space without significantly modifying the desired mechanical properties.

If the arms are folded as in FIG. 2, it is preferable also to connect the short linking element (which connects the two branches of the U) of a first arm 12 to the corresponding short element of the arm 14 which is symmetrical to the arm 12 with respect to the axis 38. A cross-member 11 is provided for this purpose, parallel to Ox, in order to connect the bottom of the U of the linking arm 12 to the bottom of the U of the flexure arm 14, the arms 12 and 14 being symmetrical with respect to the axis 38. A similar cross-member 13, symmetrical to the cross-member 11 with respect to the axis 32, connects the symmetrical elements 16 and 18. These cross-members 11 and 13, parallel to Ox, reinforce the symmetry of transmission of a movement along Oy imposed by the external intermediate frame 50 on the internal intermediate frame 10. They are not present if the arms 12, 14, 16, 18 do not have a folded shape, since in this case the ends of the arms 12 and 14 would already be rigidly connected by the external intermediate frame 50 itself.

As may be seen in FIG. 2, the folded shape in the form of an elongate U of the flexure arms between the internal intermediate frame and the external intermediate frame is obtained by recesses in the internal and external intermediate frames, but in general the flexure arms go from close to an inner corner of the internal intermediate frame to a facing corner of the external intermediate frame, even if the effective point of attachment of the arm to the frame does not start exactly from this corner. It may be considered that the internal intermediate frame is overall suspended from the external intermediate frame by its four corners.

The external intermediate frame 50, surrounded by the outer frame 20 of the coupling structure, is connected to this outer frame by a short linking arm 63 on one side and short linking arm 65 on the other, the arms 63 being symmetrical to the arm 65 with respect to the axis of symmetry 32. The arms 63, like the arms 65 are distributed along one side of the frame 50, this side being parallel to the Ox axis. These short arms constitute virtually rigid links through which the energy of vibration along Ox and Oy of the external intermediate frame 50 (and of the internal intermediate frame and the detection mass 30) can pass to the coupling structure, and therefore to the second internal 10' and external 50' intermediate frames and the second detection mass 30'. In the example shown, two short arms 63 are distributed along one side of the external intermediate frame 50 and two other short arms 65 are distributed along the opposite side.

There is no linking arm between the external intermediate frame and the outer coupling frame along the sides parallel to the Oy axis.

In a variant, the fixed anchoring zones of the detection mass 30 are separate from the fixed anchoring zones of the internal intermediate frame 10.

The gyrometer according to the invention has six in-plane vibration modes, which comprise the useful tuning-fork excitation and detection modes, the other four modes being parasitic modes. The linking means characterized by stiffness coefficients make it possible to separate the useful modes from the other, parasitic modes. The gyrometer is preferably designed in such a way that the following condition is satisfied:

$$K_{40,42,44,46}/M_{30} = (K_{60,62,64,66} + 2K_{20})/(M_{50} + M_{10}),$$

where $K_{40,42,44,46}$ is the stiffness coefficient of the second flexure arms 40, 42, 44, 46 connecting the mass 30 to the anchoring zones;

$K_{60,62,64,66}$ is the stiffness coefficient of the fourth flexure arms 60, 62, 64, 66 connecting the internal intermediate frame 10 to the anchoring zones;

$K_{20}$, is the stiffness coefficient along Oy of the outer frame; and $M_{50}$, $M_{10}$, $M_{30}$ are the respective masses of the first, second and third moving elements.

When this condition is satisfied, the tuning-fork mode is dynamically balanced, that is to say the resultant of the forces transmitted to the support is zero and the amplitude $Y_{30}$ of the detection movement of the third moving element is such that:

$$Y_{30}/Y_{50,10} = (M_{50} + M_{10})/M_{30}$$

$Y_{50,10}$ being the amplitude of the movement of the first or second moving element along Oy, the amplitude along Oy of the first element being equal to that of the second element.

By choosing $M_{30} < M_{50} + M_{10}$, the amplitude along Oy of the detection movement $Y_{30}$ is therefore greater than that of both the first and second elements. In this way, it is therefore possible to increase the sensitivity of the gyrometer in the ratio $(M_{50} + M_{10})/M_{30}$.

Figure 3:
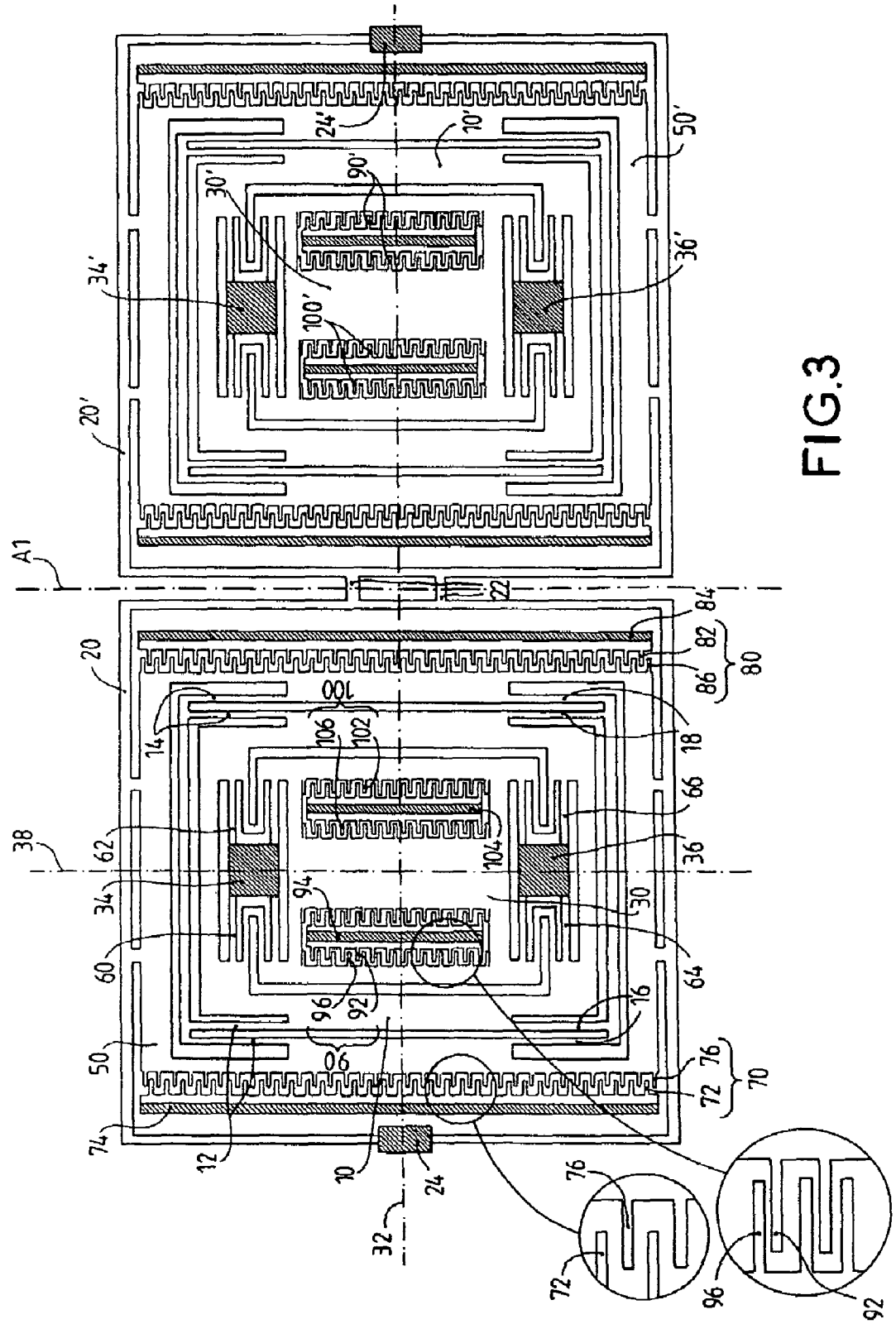
FIG. 3 shows schematically, in top view, the more detailed structure of the micromachine gyrometer according to the invention.

As indicated in FIG. 3, the external intermediate frame 50 is excited into vibration along Ox by a first interdigitated-comb structure 70 which comprises a fixed half-comb 72, attached to an anchoring zone 74, and a moving half-comb 76 formed along a first side (parallel to Oy) of the frame 50. The teeth or fingers of the fixed half-comb 72, made of conductive silicon machined at the same time as the other elements of the gyrometer, form the first plate of a capacitor and the teeth or fingers of the moving half-comb 76, also made of conductive silicon, form the second plate of this capacitor. Conventionally, the comb structure acts as an exciter, which excites the movement of the moving part thanks to the attractive forces that are exerted between the facing fingers when a voltage is applied between the half-combs. The excitation voltage is an AC voltage in order to generate a vibration movement, and the frequency of this voltage is chosen to be very close or equal to the mechanical resonant frequency of the structure. The excitation voltage is applied between the anchoring zone 74 and one or both of the anchoring zones 34 and 36. The fixed half-comb 72 is in direct electrical contact (via the conductive silicon body) with the anchoring zone 74; the moving half-comb 76 is in contact with the anchoring zones 34 and 36 via the flexure arms 12, 14, 16, 18 of the body of the internal intermediate frame 10, of the flexure arms 60, 62, 64, 66 and via the frame 50, so that, when a voltage is applied between the anchoring zone 74 and the anchoring zones 34 or 36, a voltage is in fact applied between the fixed part and the moving part of the comb 70.

The excitation movement generated on the external intermediate frame 50 is along the Ox direction, the combs acting by modifying the area of mutual overlap of the interdigitated fingers.

Preferably, the microgyrometer has another interdigitated-comb structure associated with the frame, which is symmetrical to the structure 70 with respect to the axis 38. It comprises a fixed half-comb 82, attached to an anchoring zone 84, and a moving half-comb 86 machined along one side of the frame 50. This structure may serve for detecting the movement of the frame along Ox and is useful for being able to control the movement excited by the comb 70; in general, control is useful in order to adjust the excitation frequency with respect to the resonant frequency of the structure. The voltages detected by the structure 80 appear between the anchoring zone 84 and the anchoring zones 34 and 36.

At least one interdigitated comb is associated with the detection mass 30 in order to detect the movement of the detection mass in the Oy direction. The orientation of these combs depends on the principle upon which the detection is based: if detection is based upon a measurement of the changes in area of mutual overlap of the fingers of the fixed and moving half-combs, the detection comb for detecting movements along Oy is placed perpendicular to the excitation comb 70 (which is also based upon changes in the area of overlap). However, if detection is based upon a measurement of the changes in spacing between the fingers of the fixed half-comb and of the moving half-comb, the detection comb is placed parallel to the excitation comb. Detection by the change in spacing between fingers is preferred as it is more sensitive. The interdigitization of the combs is then unsymmetrical at rest, the fingers of one half-comb not being exactly in the middle of the gap between two fingers of the other half-comb, whereas a comb operating, (like the excitation comb) on the basis of changes in the area of overlap has the fingers of one half-comb in the middle of the gap between the fingers of the other half-comb.

This is the case in FIG. 3: the detection combs are placed with the same general orientation of the combs 70 and 80, although they are associated with a movement along Oy, whereas the combs 70 and 80 are associated with a movement (excitation or detection) along Ox.

In the example shown in FIG. 3, the detection mass is associated with two identical interdigitated combs 90 and 100 that are placed parallel to the axis of symmetry 38 and on either side of this axis. These combs both act as a detector of the movement of the mass along Oy and it would be possible, as a variant, to be limited to a single comb placed at the center of the mass along the axis 38.

The comb 90 comprises a fixed half-comb 92, attached to an anchoring zone 94, and a moving half-comb 96 forming part of the detection mass itself. The detection mass has a recess so as to leave room for the fixed comb 92 and for the anchoring zone 94, and the edges of this recess are cut in the form of fingers in order to constitute the moving half-comb 96 with which the fingers of the fixed half-comb will interdigitate. In the example shown, the comb 90 is a double comb, that is to say both sides of the recess in the mass 30 are provided with fingers, and the fixed half-comb 92 has fingers on either side of the anchoring zone 94.

The interdigitated structure 100 is strictly symmetrical with the structure 90 and is formed in another recess of the detection mass 30. It comprises a fixed half-comb 102, an anchoring zone 104 and a moving half-comb 106.

To detect the movement along Oy, an electronic circuit associated with this structure detects the amplitude modulation of the electrical voltages present between the anchoring zone 94 and the anchoring zones 34 and 36, and/or between the zone 104 and the zones 34 and 36. This modulation is due only to a displacement of the detection mass along the axis Oy, since the mass can move only along this axis.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A gyrometer based on a vibrating structure, comprising: in a thin planar wafer including two symmetrical moving assemblies coupled by a coupling structure connecting these two assemblies in order to allow transfer of mechanical vibration energy between them, each moving assembly comprising three moving elements, a first inertial moving element intended to vibrate in two orthogonal directions Ox and Oy in the plane of the wafer, a second moving element intended to vibrate along Oy and connected to the first moving element and to fixed anchoring zones, by first linking means which allow the vibration movement of the first moving element along Oy to be transmitted to the second moving element without permitting movement of the second element along the Ox direction and a third moving element intended to vibrate along Oy and connected to the second moving element and to fixed anchoring zones by second linking means which allow the vibration movement of this second moving element along Oy to be transmitted, in phase opposition, to the third moving element.

2. The gyrometer as claimed in claim 1, wherein the first moving element is a rectangular external intermediate frame connected to the coupling structure and surrounding the second moving element having a rectangular internal intermediate frame which surrounds the third moving element, and the coupling structure comprises an outer frame surrounding the external intermediate frame.

3. The gyrometer as claimed in claim 2, wherein the third moving element, designated the detection mass, is connected to the internal intermediate frame by two first narrow and elongate flexure arms which exhibit high resistance to elongation in the Ox direction and a low stiffness in the Oy direction, and the detection mass is connected to at least one anchoring zone by at least two second narrow and elongate flexure arms which exhibit high resistance to elongation in the Ox direction and low stiffness in the Oy direction.

4. The gyrometer as claimed in claim 3, wherein each first flexure arm is folded in the form of a U and has two elongate parts extending in the Ox direction, these two parts being connected by a short linking element.

5. The gyrometer as claimed in claim 4, wherein the internal intermediate frame is connected to the external intermediate frame by two third narrow and elongate flexure arms which exhibit high resistance to elongation in the Oy direction and low stiffness in the Ox direction, and the internal intermediate frame is connected to an anchoring zone by at least two fourth narrow and elongate flexure arms which exhibit high resistance to elongation in the Ox direction and low stiffness in the Oy direction.

6. The gyrometer as claimed in claim 4, wherein the coupling structure is connected to the first moving element of each assembly by short rigid links.

7. The gyrometer as claimed in claim 3, wherein the internal intermediate frame is connected to the external intermediate frame by two third narrow and elongate flexure arms which exhibit high resistance to elongation in the Oy direction and low stiffness in the Ox direction, and the internal intermediate frame is connected to an anchoring zone by at least two fourth narrow and elongate flexure arms which exhibit high resistance to elongation in the Ox direction and low stiffness in the Oy direction.

8. The gyrometer as claimed in claim 3, wherein the coupling structure is connected to the first moving element of each assembly by short rigid links.

9. The gyrometer as claimed in claim 3, wherein the coupling structure comprises, around each moving assembly, an outer frame and a short linking bar between the outer frames.

10. The gyrometer as claimed in claim 2, wherein the internal intermediate frame is connected to the external intermediate frame by two third narrow and elongate flexure arms which exhibit high resistance to elongation in the Oy direction and low stiffness in the Ox direction, and the internal intermediate frame is connected to an anchoring zone by at least two fourth narrow and elongate flexure arms which exhibit high resistance to elongation in the Ox direction and low stiffness in the Oy direction.

11. The gyrometer as claimed in claim 10, wherein each third flexure arm is folded in the form of a U and has two elongate parts extending in the Oy direction, these two parts being connected by a short linking element.

12. The gyrometer as claimed in claim 11, wherein that the short linking element of one of the third arms is connected to the similar linking element of another third arm by a cross-member elongate in the Ox direction.

13. The gyrometer as claimed in claim 2, wherein the coupling structure is connected to the first moving element of each assembly by short rigid links.

14. The gyrometer as claimed in claim 2, wherein the coupling structure comprises, around each moving assembly, an outer frame and a short linking bar between the outer frames.

15. The gyrometer as claimed in claim 2, wherein the fixed anchoring zones of the third moving element are separate from the second fixed anchoring zones of the second moving element.

16. The gyrometer as claimed in claim 1, wherein the coupling structure is connected to the first moving element of each assembly by short rigid links.

17. The gyrometer as claimed in claim 1, wherein the coupling structure comprises, around each moving assembly, an outer frame and a short linking bar between the outer frames.

18. The gyrometer as claimed in claim 1, wherein the fixed anchoring zones of the third moving element are separate from the second fixed anchoring zones of the second moving element.

19. The gyrometer as claimed in of claims 1, wherein the following condition is satisfied or virtually satisfied $$K_{40,42,44,46}/M_{30}=(K_{60,62,64,66}+2K_{20})/(M_{50}+M_{10}).$$

where $K_{40,42,44,46}$ is the stiffness coefficient of the second flexure arms, $K_{60,62,64,66}$ is the stiffness coefficient of the fourth flexure arms, $K_{20}$ is the stiffness coefficient along Oy of the outer frame and $M_{50},M_{10},M_{30}$ are the respective masses of the first, second and third moving elements.

20. The gyrometer as claimed in claim 19, wherein $M_{30}<M_{50}+M_2$ so as to increase the sensitivity of the gyrometer.

* * * * *